(12) United States Patent  
Lasko et al.

(10) Patent No.: US 6,485,110 B1
(45) Date of Patent: Nov. 26, 2002

(54) DRIVE HUB HAVING AN OIL CHECK HOLE

(75) Inventors: Rick T. Lasko, Oak Lawn, IL (US); Frank Moeller, Milford (GB)

(73) Assignee: Caterpiller Inc, Peoria, IL (US)

( * ) Notice: Subject to any disclaimer, the term of this patent is extended or adjusted under 35 U.S.C. 154(b) by 0 days.

(21) Appl. No.: 09/928,938

(22) Filed: Aug. 13, 2001

Related U.S. Application Data

(60) Provisional application No. 60/235,440, filed on Sep. 26, 2000.

(51) Int. Cl.[7] .......................... B60B 27/00; G10K 11/00; F16H 57/02; F16H 57/04
(52) U.S. Cl. ................... 301/108.2; 180/9.1; 74/606 A; 475/159
(58) Field of Search .................. 301/108.2 I, 108.1, 301/105.1; 180/9.1; 74/606 A, 606 R; 475/159, 160

(56) References Cited

U.S. PATENT DOCUMENTS

| | | | | |
|---|---|---|---|---|
| 1,068,626 A | * | 7/1913 | Buck ........................ | 301/108.2 |
| 2,294,578 A | | 9/1942 | Shapiro et al. | |
| 2,647,406 A | * | 8/1953 | Sorensen ................. | 301/108.2 |
| 3,083,873 A | | 4/1963 | Hirsekorn | |
| 3,089,338 A | * | 5/1963 | Glasgow ................... | 301/108.2 |
| 3,089,738 A | * | 5/1963 | Steiner ..................... | 301/108.2 |
| 3,114,579 A | * | 12/1963 | Isenburger ............... | 301/108.2 |
| 3,453,886 A | | 7/1969 | Avrea | |
| 3,505,870 A | | 4/1970 | Smylie | |
| 3,738,176 A | | 6/1973 | Kerfoot | |
| 3,871,462 A | * | 3/1975 | Krolak et al. ................ | 180/9.5 |
| 5,024,488 A | * | 6/1991 | Lindhuber et al. ........ | 301/108.2 |
| 5,066,071 A | * | 11/1991 | Kinser ...................... | 301/108.2 |
| 5,472,059 A | * | 12/1995 | Schlosser et al. ........... | 475/159 |
| 5,515,747 A | * | 5/1996 | Okada et al. .............. | 74/606 R |
| 5,560,619 A | * | 10/1996 | Acree ...................... | 301/105.1 |
| 5,657,665 A | | 8/1997 | Ostermeier | |
| 6,039,667 A | * | 3/2000 | Schunck et al. ............ | 475/159 |

* cited by examiner

Primary Examiner—S. Joseph Morano
Assistant Examiner—Jason R. Bellinger
(74) Attorney, Agent, or Firm—John W Morrison; John J Cheek

(57) ABSTRACT

An apparatus for determining the amount of lubricant within a housing is disclosed. The apparatus includes a shaft driving the housing about an axis, a number of interior components positioned within the housing, and an opening defined in the housing and centered on the axis. The distance between the a lower edge of the opening and the lowest portion of the housing is proportional to the amount of lubricant displaced by the components. The level of the lubricant within the housing determined relative to the lower edge. A work machine and method are also disclosed.

20 Claims, 2 Drawing Sheets

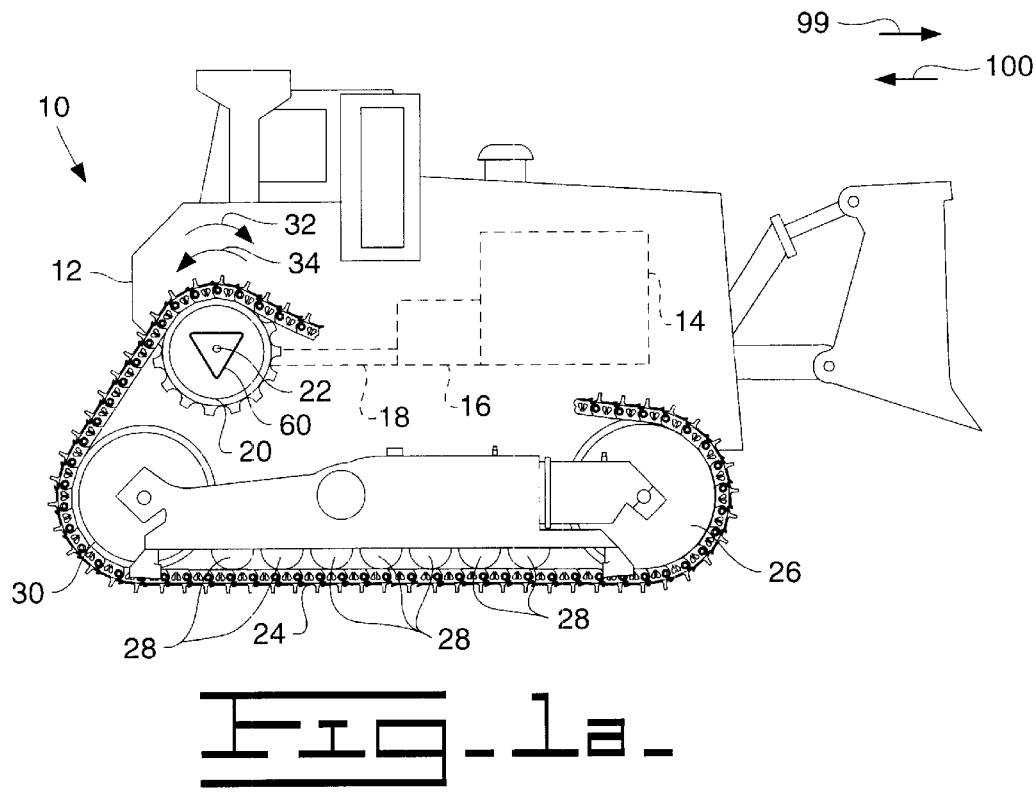
Fig_1a_
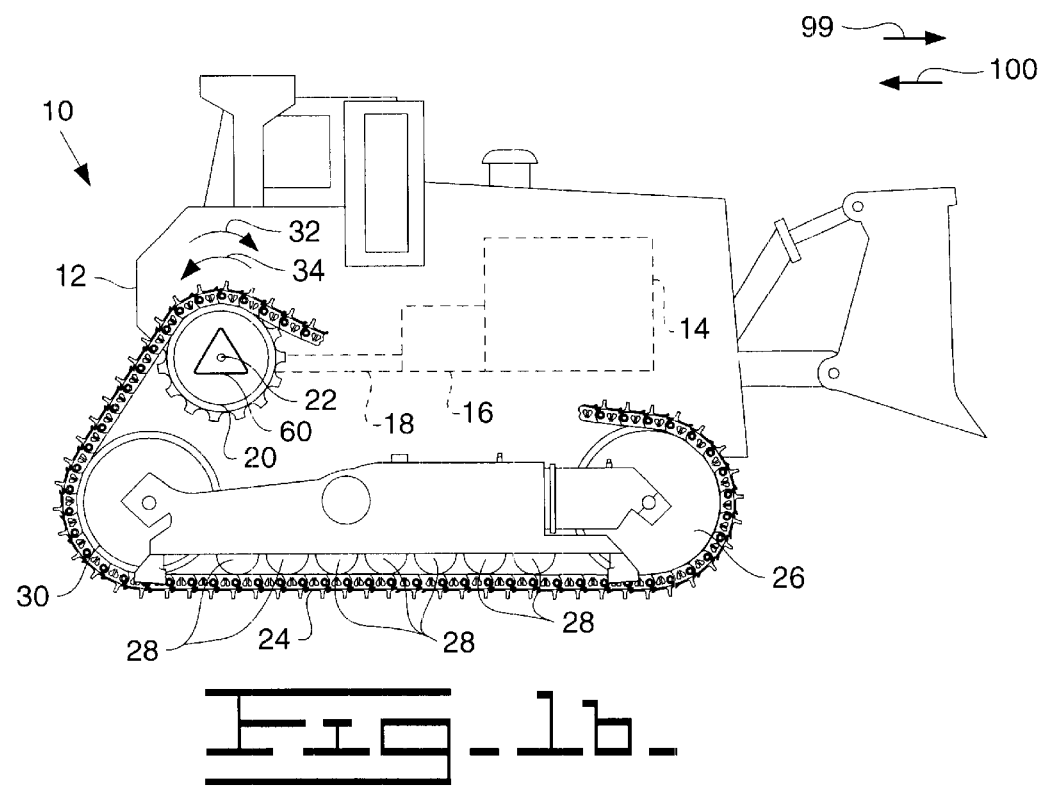
Fig_1b_

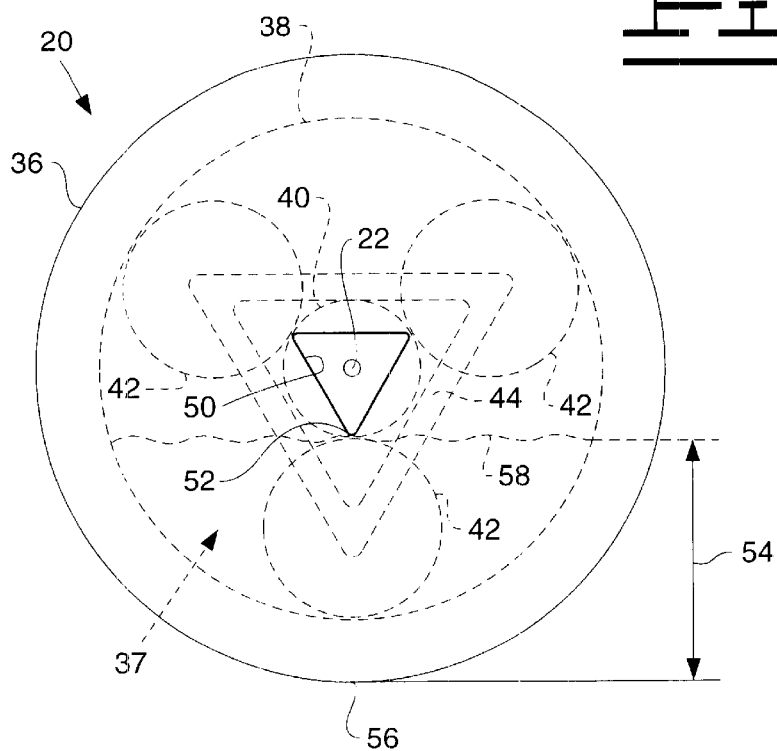
Fig-2a-
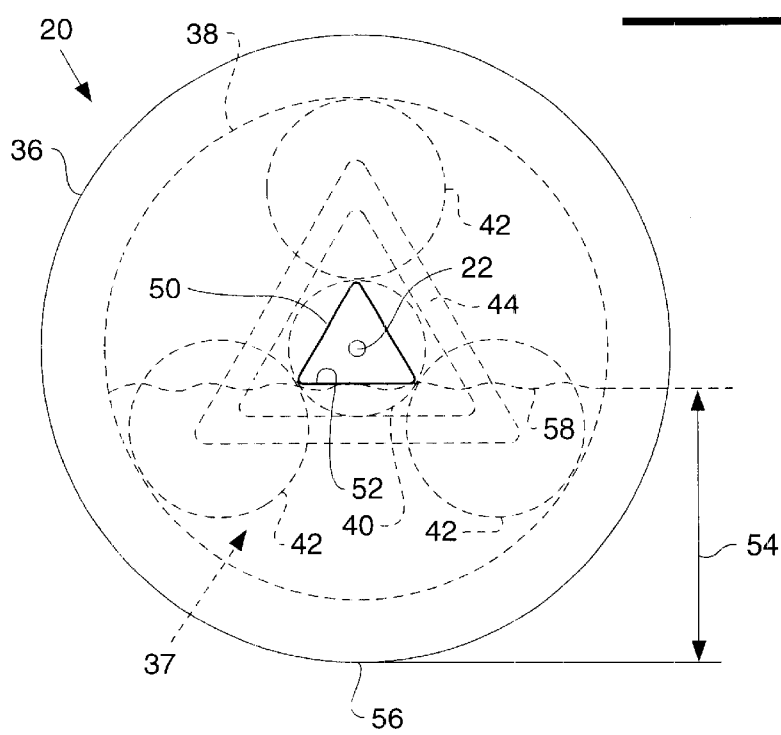
Fig-2b-

DRIVE HUB HAVING AN OIL CHECK HOLE

This application claims the benefit of prior provisional patent application Ser. No. 60/235,440, filed Sep. 26, 2000.

TECHNICAL FIELD

The present invention generally relates to a drive hub, and more specifically to a drive hub having an oil check hole.

BACKGROUND

Many new machines have drive hubs which contain a number of internal components such as gears. These components need to be lubricated in order to ensure a long service life. Generally, an oil check hole is provided so that the level of the lubricant within the drive hub can be checked. A drawback to oil check holes that have heretofore been used in drive hubs is that reading the level of the oil within the drive hub requires that the hub be moved to a predetermined orientation prior to checking the lubricant level. In addition, there are usually at least two drive hubs, so the work machine must be precisely positioned at least twice to read the lubricant level in both drive hubs.

Placing the oil check hole along the axis of rotation would allow the level of lubricant to be read if the components within the drive hub were equally distributed about the axis. Unfortunately, many drive hubs contain planetary gear sets which have a number of planet gears positioned between a sun gear and a ring gear. A drawback to using a single round hole placed along the axis of rotation is that it would be impossible to accurately read the level of lubricant within the drive hub at any orientation if the hub contained a planetary gear set.

What is needed therefore is a drive hub having an oil check hole which overcomes the above-mentioned drawbacks.

SUMMARY OF THE INVENTION

In accordance with a first aspect of the present invention, there is provided an apparatus for determining the amount of lubricant within a housing. The apparatus includes a shaft driving the housing about an axis, a number of interior components positioned within the housing, and an opening defined in the housing and centered on the axis. The distance between the a lower edge of the opening and the lowest portion of the housing is proportional to the amount of lubricant displaced by the components. The level of the lubricant within the housing is determined relative to the lower edge.

In accordance with a second aspect of the present invention, there is provided a work machine having, a frame, an engine, a shaft driven by the engine which drives the housing about an axis, a number of interior components positioned within the housing, and an opening defined in the housing and centered on the axis. The distance between the a lower edge of the opening and the lowest portion of the housing is proportional to the amount of lubricant displaced by the components. The level of the lubricant within the housing is determined relative to the lower edge.

In accordance with a third aspect of the present invention, there is provided a method for determining the amount of lubricant within a housing (ii) driven by a shaft along an axis, (ii) having a number of interior components positioned therein, having an opening defined therein and centered on the axis. The method includes the step of configuring the opening such that the distance between the lower edge of the opening and the lowest portion of the housing is proportional to the amount of lubricant displaced by the components. The method further includes the step of determining the level of the lubricant within the housing relative to the lower edge.

BRIEF DESCRIPTION OF THE DRAWINGS

FIG. 1A is a side view of a work machine in a first position which incorporates the features of the present invention therein;

FIG. 1B is a side view of the work machine of FIG. 1A in a second position;

FIG. 2A is an enlarged view of the drive hub of the work machine of FIG. 1A; and FIG. 2B is an enlarged view of the drive hub of the work machine of FIG. 1B.

DETAILED DESCRIPTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1A, there is shown a work machine 10 having a frame 12. The frame 12 provides the structure to support components such a the engine 14, transmission 16, and drive shaft 18. The engine 14 provides the motive power to drive the transmission 16 which further drives the driveshaft 18. The drive shaft 18 is operatively coupled to a hub 20 via a differential (not shown) and shaft (not shown) which rotates the hub 20 about an axis of rotation 22.

The hub 20 drives a track 24 via drive teeth positioned about the outer periphery of the hub 20. The track forms a path about the hub 20, a front idler gear 26, a number of boogie wheels 28, and a rear idler wheel 30. As the hub 20 is driven by the engine 14 in the general direction of arrow 32, the work machine 10 is driven in the forward direction of arrow 99. Similarly, as the hub is driven by the engine 14 in the general direction of arrow 34, the work machine 10 is driven in the reverse direction of arrow 100.

Referring now to FIG. 2A, there is shown an enlarged view of the hub 20. The hub 20 has an enclosed housing 36 with a number of interior components 37 positioned within. In the example shown, the interior components 37 include a planetary gear set having a ring gear 38, a sun gear 40, and three planet gears 42. Each of the planet gears 42 is intermeshed with the ring gear 38 and the sun gear 40 and are operatively connected to the respective planet gears 42 via a planet carrier 44.

An opening 50 is defined through the housing 36 and is centered about the axis of rotation 22 in the center of the hub 20. A lower edge 52 of the opening 50 is defined such that the distance 54 between the lower edge 52 of the opening 50 and the lowest portion 56 of the housing 36 is proportional to the amount of lubricant displaced by the interior components 37. It should be appreciated that the distance 54 is a function of the orientation of the hub 20, as the interior components 37 are not evenly distributed about the axis of rotation 22. For example, the lubricant level 58 in a first orientation (shown in FIG. 2A) in which a single planet gear 42 is submerged in lubricant is much lower than the lubricant level in a second orientation (shown in FIG. 2B) in which a pair of planet gears 42 are submerged in lubricant. Therefore, the distance 54 in the first orientation (shown in FIG. 2A) is less than the distance 54 in the second orientation (shown in FIG. 2B) as the distance 54 is proportional to the amount of oil displaced by the interior components 37.

To determine the level of oil within the hub 20, it is only necessary to determine the level of lubricant relative to the lower edge 52 as the lower edge 52 is defined relative to the amount of oil displaced by the interior components 37. In addition, it should be appreciated that the opening 50 described herein has a triangular shape due to the three planet gears 42 positioned within the housing 36. If the number of planet gear 42 is increased to four, then the opening 50 would have a square shape, whereas if the number of planet gears 42 were increased to five, the opening would have a pentagonal shape. In addition, if the number of planet gear 42 were reduced to two, the opening 50 would have an oval shape.

Referring now to FIGS. 1A and 1B, a cap 60 is placed over the opening 50 (shown in FIGS. 2A and 2B) to seal the lubricant within the hub 20. In addition, a seal (not shown) is positioned between the cap 60 and the exterior of the hub 20 to further complete the seal between the hub 20 and the cap 60.

When the work machine is positioned in a first position (shown in FIG. 1A) the hub 20 is positioned in the first orientation (shown in FIG. 2A) and the level of lubricant within the hub 20 can be determined by removing the cap 60 and determining a level relative to the lower edge 52 of the opening 50. As engine 14 drives the work machine 10 in either the forward direction 99 or the reverse direction 100, the work machine 10 can be positioned in a second position (shown in FIG. 1B). In the second position, the hub 20 is positioned in the second orientation (shown in FIG. 2B) and the level of lubricant can be determined by removing the cap 60 and determining a level relative to the lower edge 52 of the opening 50. It should be appreciated that the level of lubricant may be determined in any machine position or any hub orientation between the first orientation and the second orientation by removing the cap 60 and determining a level relative to the lower edge 52 of the opening 50. The level of lubricant within the housing 36 is proportional to the amount of lubricant displaced by the interior components 37 and the opening 50 has been advantageously configured such that the distance 54 between the lower edge 52 and lowest portion 56 is proportional to the amount of displaced lubricant. An advantage to being able to read the lubricant level in any machine position or lubricant level is that maintenance personnel do not have to move the work machine 10 to check the lubricant levels.

Industrial Applicability

In operation, the level of lubricant within a drive hub 20 may be determined by configuring an opening 50 within the hub 20 such that a distance 54 between a lower edge 52 of the opening 50 and the lowest portion 56 of a housing 36 is proportional to the amount of lubricant displaced by interior components 37 within a housing 36.

If the internal components 37 include a planetary gear set having a sun gear 40, a ring gear 38, and a planet carrier 44 having three planet gears 42, then the opening 50 will define a triangular shape in the housing 36.

In addition to the cap 60, a seal may be provided to seal the opening 50 and prevent contaminants from entering the lubricant via the opening 50.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

Other aspects, objects and advantages of this invention can be obtained from a study of the drawings, the disclosure and the appended claims.

What is claimed is:

1. An apparatus for determining the amount of lubricant within a housing comprising:
   a shaft driving the housing about an axis;
   a number of interior components positioned within the housing; and
   an opening defined in the housing and centered on the axis, said opening having a lower edge, wherein:
      a distance between the lower edge of the opening and a lowest portion of the housing is proportional to an amount of lubricant displaced by the components, and
      a level of the lubricant within the housing is determined relative to the lower edge of the opening.

2. The apparatus of claim 1, wherein:
   the housing is positionable in a first orientation and a second orientation, and
   a level of the lubricant within the housing relative to the lower edge of the opening in the first orientation is substantially equal to a level of the lubricant within the housing relative to the lower edge of the opening in the second orientation.

3. The apparatus of claim 1, wherein:
   the components include a planetary gear set having a sun gear, a ring gear, and a planet carrier having three planet gears, and
   the opening has a triangular shape.

4. The apparatus of claim 1, further comprising a cap which covers the opening.

5. The apparatus claim of 4, further comprising a seal positioned between said cap and said housing to prevent the lubricant from escaping the housing.

6. An apparatus comprising:
   a frame;
   an engine;
   a shaft driven by the engine which drives the housing about an axis;
   a number of interior components positioned within the housing; and
   an opening defined in the housing and centered on the axis, said opening having a lower edge, wherein:
      a distance between the lower edge of the opening and a lowest portion of the housing is proportional to an amount of lubricant displaced by the components, and
      a level of the lubricant within the housing is determined relative to the lower edge of the opening.

7. The apparatus of claim 6, wherein:
   the housing is positionable in a first orientation and a second orientation, and
   a level of the lubricant within the housing relative to the lower edge of the opening in the first orientation is substantially equal to the level of the lubricant within the housing relative to the lower edge of the opening in the second orientation.

8. The apparatus of claim 6, wherein:
   the components include a planetary gear set having a sun gear, a ring gear, and a planet carrier having three planet gears, and the opening has a triangular shape.

9. The apparatus of claim 6, further comprising a cap which covers the opening.

10. The apparatus claim 9, further comprising a seal positioned between said cap and said housing to prevent the lubricant from escaping the housing.

11. A method for determining the amount of lubricant within a housing (i) driven by a shaft about an axis, (ii) having a number of interior components positioned therein, and (iii) having an opening defined therein and centered on the axis, the method comprising the steps of:

configuring the opening such that a distance between a lower edge of the opening and a lowest portion of the housing is proportional to an amount of lubricant displaced by the components, and determining a level of the lubricant within the housing relative to the lower edge of the opening.

12. The method of claim 11, further comprising the steps of:

placing the housing in a first orientation and a second orientation, determining a level of the lubricant within the housing relative to the lower edge of the housing in the first orientation which is substantially equal to the level of the lubricant within the housing relative to the lower edge of the housing in the second orientation.

13. The method of claim 11, wherein the internal components include a planetary gear set having a sun gear a ring gear and a planet carrier having three planet gears, and wherein the opening has a triangular shape.

14. The method of claim 11, further comprising the step of sealing the housing to prevent the lubricant from escaping the housing.

15. The apparatus of claim 1, wherein:

said number of interior components comprises a planetary gear set having a plural number of planet gears; and said opening is generally in the shape of a polygon having a number of sides equal to the number of planet gears.

16. The apparatus of claim 6, wherein:

said number of interior components comprises a planetary gear set having a plural number of planet gears; and said opening is generally in the. shape of a polygon having a number of sides equal to the number of planet gears.

17. The method of claim 11, wherein:

said number of interior components comprises a planetary gear set having a plural number of planet gears; and said configuring step includes configuring said opening generally in the shape of a polygon having a number of sides equal to the number of planet gears.

18. An apparatus for determining an amount of lubricant within a housing, comprising:

an annular housing rotatable about an axis and having a circumference, said housing further having a varying circumferential segment spaced elevational farther below said axis than other circumferential segments of said housing;

said housing having an opening formed therein centered on the axis of rotation of said housing, said opening having a peripheral margin, said margin having a varying lowest peripheral margin segment spaced elevationally farther below said axis than other peripheral margin segments of said opening;

a volume of lubricant within said housing;

a plurality of interior components positioned within said housing and movable relative to the volume of lubricant such that at least some of said components move into and out of the volume of lubricant;

wherein the opening in said housing is configured such that the elevational distance between the lowest circumferential segment of the housing and the lowest peripheral margin segment of the opening in said housing is proportional to an amount of lubricant displaced by said at least some of said interior components.

19. The apparatus of claim 18, wherein:

said plurality of interior components comprises a planetary gear set having a plural number of planet gears; and said opening is generally in the shape of a polygon having a number of sides equal to the number of planet gears.

20. An apparatus for determining an amount of lubricant within a housing, comprising:

a housing rotatable about an axis;

a planetary gear set positioned within the housing and including a plural number of planet gears;

a volume of lubricant within the housing;

said housing having a opening formed therein centered on said axis, the opening being generally in the shape of a polygon having a number of sides equal to the number of planet gears in said planetary gear set;

wherein a level of lubricant within said housing is determined relative to a margin of the opening in said housing.

* * * * *

UNITED STATES PATENT AND TRADEMARK OFFICE
CERTIFICATE OF CORRECTION

PATENT NO. : 6,485,110 B1
DATED : November 26, 2002
INVENTOR(S) : Rick T. Lasko et al.

It is certified that error appears in the above-identified patent and that said Letters Patent is hereby corrected as shown below:

Column 5,
Line 43, after the word "the" and before the word "shape" delete "."

Signed and Sealed this

Second Day of September, 2003

JAMES E. ROGAN
*Director of the United States Patent and Trademark Office*